(12) United States Patent
Chalmer et al.

(10) Patent No.: US 8,533,696 B1
(45) Date of Patent: Sep. 10, 2013

(54) METHODS AND SYSTEMS FOR ALLOCATING HARDWARE RESOURCES TO INSTANCES OF SOFTWARE IMAGES

(75) Inventors: Steven R. Chalmer, Auburndale, MA (US); Steven T. McClure, Northboro, MA (US); David L. Reese, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 1364 days.

(21) Appl. No.: 11/540,459

(22) Filed: Sep. 29, 2006

(51) Int. Cl.
*G06F 9/45* (2006.01)

(52) U.S. Cl.
USPC .......................................................... 717/149

(58) Field of Classification Search
USPC . 717/100, 118, 127, 149, 161; 718/100–104; 713/1, 300; 712/228; 375/224; 711/100; 710/22; 707/201
See application file for complete search history.

(56) References Cited

U.S. PATENT DOCUMENTS

| | | | |
|---|---|---|---|
| 7,356,677 B1 * | 4/2008 | Rafizadeh | 713/1 |
| 2002/0073135 A1 * | 6/2002 | Meyer | 709/107 |
| 2005/0080824 A1 * | 4/2005 | Vaidyanathan et al. | 707/201 |
| 2005/0081183 A1 * | 4/2005 | Accapadi et al. | 717/100 |
| 2005/0132121 A1 * | 6/2005 | Robinson | 711/100 |
| 2005/0132362 A1 * | 6/2005 | Knauerhase et al. | 718/1 |
| 2006/0123251 A1 * | 6/2006 | Nakajima et al. | 713/300 |
| 2006/0206635 A1 * | 9/2006 | Alexander et al. | 710/22 |
| 2006/0212840 A1 * | 9/2006 | Kumamoto et al. | 717/100 |
| 2006/0268967 A1 * | 11/2006 | Drezet | 375/224 |
| 2007/0043935 A2 * | 2/2007 | Kissell | 712/228 |
| 2007/0101076 A1 * | 5/2007 | Dixon et al. | 711/161 |
| 2008/0028408 A1 * | 1/2008 | Day et al. | 718/104 |

OTHER PUBLICATIONS

P. D. Medeiros et al., "Using a PC Simulator to Illustrate Input-Output Programming Techniques," ITICSE '05, Jun. 27-29, 2005, Monte da Caparica, Portugal, 1 p.
P. Barham et al., "Xen and the Art of Virtualization," SOSP'03, Oct. 19-22, 2003, Bolton Landing, New York, 14 pp.

* cited by examiner

*Primary Examiner* — Tuan A Vu
(74) *Attorney, Agent, or Firm* — Muirhead and Saturnelli, LLC (57) ABSTRACT

Methods and systems are disclosed that relate to running a plurality of software instances on an embedded computer system without requiring substantial modifications to each software instance. An exemplary method includes storing context information relating to a first instance. An instance includes a set of independent threads of execution each with its own code context, interrupt service routines, drivers, and operating system services. Both a second instance and a thread associated with the second instance are chosen to run. Context information relating to the second instance is restored and the second instance is run on the operating system.

14 Claims, 6 Drawing Sheets

METHODS AND SYSTEMS FOR ALLOCATING HARDWARE RESOURCES TO INSTANCES OF SOFTWARE IMAGES

BACKGROUND

A central processing unit (CPU), or sometimes simply processor, is the component in a digital computer that interprets instructions and processes data contained in computer programs. The fundamental operation of most CPUs, regardless of the physical form they take, is to execute a sequence of stored instructions called a program. An operating system (OS) is a software program that manages the hardware and software resources of a computer. The OS performs basic tasks, such as controlling and allocating memory, prioritizing the execution of programs, controlling input and output devices, providing network access, and managing files.

A software instance is an application program running on an embedded computer system. Typically a software instance will include the application code and the operating system code built together as a single executable image sharing all the computer memory and hardware resources.

In a multi-tasking program, there are independent sequences of code (threads) which execute asynchronously with respect to each other. In such programs, an operating system service, called a thread scheduler, provides the mechanism for selecting which of the threads to run. Multi-tasking programs are further divided into two groups: pre-emptive systems in which control of the scheduling mechanism is based on asynchronous external events, such as a timer interrupt; and cooperative systems in which control of the scheduling mechanism is determined by the threads in the program itself.

To execute more than one software instance on a computer system, the following three problems have to be solved:
1. Each software instance must have an isolated address space from the other instances. This is accomplished using the MMU to provide a logical address space for each instance. A MMU defines a mapping between logical addresses and physical addresses. In one typical design, the logical address space is divided into fixed size units called "pages" and the mapping is defined by a set of "page tables".
2. Each software instance must be able to access all of the hardware resources, such as I/O devices, that it requires for its operation, including any interrupts that are defined by the underlying hardware. The invention does not resolve the problem of simultaneous access to the same hardware by different instances.
3. There must be a mechanism for selecting which software instance to run and switching the execution environment between different instances on the computer system. This mechanism is performed by an "instance scheduler". Swapping instances requires saving the state of the execution environment, called a code context and restoring the code context of the next software instance to run.

Previous methods of running more than one instance on a computer system included virtualization. Virtualization works by providing a hardware abstraction layer, which can be either complete or partial. The XEN™ virtual machine, available from XenSource Inc., enables the execution of multiple guest operating systems on the same computer hardware. This form of virtualization is achieved using a technique called paravirtualization. In paravirtualization, a software interface is presented to a virtual machine that is similar but not identical to that of the underlying hardware. Presenting the software instance to the virtual machine requires the OS to be explicitly ported to run on top of the virtual machine, but may enable the virtual machine itself to be simpler and the virtual machines that run on it to achieve higher performance.

Emulation is another method of running more than one instance on a computer system. A software emulator allows computer programs to run on a platform other than the one for which they were originally compiled and linked. The BOCHS emulator, available from <http://bochs.sourceforge.net/> and sponsored by Mandrakesoft, a French company now known as Mandriva, can emulate the hardware needed by the guest operating system, including hard drives, CD drives, and floppy drives. Disk and ISO images can be "inserted" while the system is being run. However, the system performance is very slow due to the fact that the emulation must completely simulate the CPU instruction set. Additionally, emulation doesn't provide any hardware virtualization features.

SUMMARY

Methods and systems are disclosed for running a plurality of software instances on an embedded computer system without requiring substantial modifications to each software instance. One embodiment of the invention is a method for storing context information relating to a first instance. An instance includes a set of independent threads of execution each with its own code context, interrupt service routines, drivers, and OS services. The method includes choosing a second instance to run, and choosing a thread associated with the second instance to run. The method also includes restoring context information relating to the second instance and running the second instance.

Another embodiment of the invention is a system for running a plurality of software instances on an embedded computer system. The system includes one or more CPUs and a memory. The CPUs and the memory are configured to perform a method comprising storing context information relating to a first instance. The method includes choosing a second instance to run and choosing a thread associated with the second instance to run. The method further includes restoring context information relating to the second instance and running the second instance.

Additional embodiments consistent with principles of the invention are set forth in the detailed description that follows or may be learned by practice of methods or use of systems or articles of manufacture disclosed herein. It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention. In the drawings.

DETAILED DESCRIPTION

With respect to the present invention, the inventors recognized the need to be able to run more than one software instance on a system with more than one CPU or on a CPU complex sharing the same memory domain. The inventors recognized this need exists even for programs that were written to be executed with dedicated memory resources. As will be described further below, the present invention can enable multiple software instances to run on a system including more than one CPU, simultaneously in parallel without interfering with each other. Additionally, the present invention can enable multiple instances to run on a single CPU by timesharing on the single CPU. The present invention enables instances on separate CPUs to be swapped at independent times without having to be synchronized.

Reference is now made in detail to illustrative embodiments of the invention, examples of which are shown in the accompanying drawings.

Figure 1:
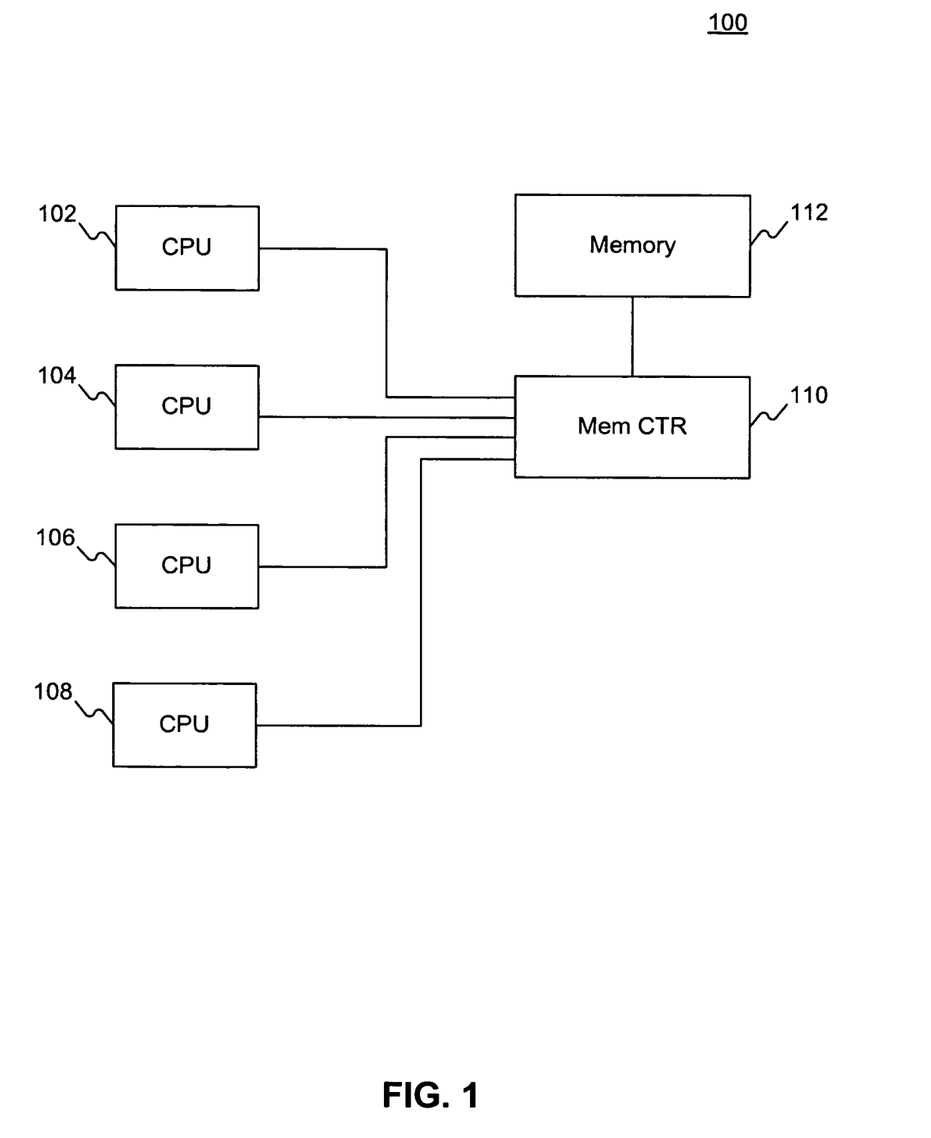
FIG. 1 illustrates a multiprocessor environment, consistent with features and principles of the present invention.

FIG. 1 illustrates an exemplary multiprocessor environment, consistent with features and principles of the present invention. Referring to FIG. 1, a schematic diagram 100 shows CPUs (processors) 102, 104, 106, and 108 coupled to a memory control 110, which is coupled to memory 112. The CPUs 102, 104, 106, and 108 can be any one of a number of commercially-available CPU devices (with corresponding support and interface circuitry), such as the PowerPC CPU provided by IBM, Inc. The present invention can enable instances, which may not be written to ensure that their threads are protected from other instances' threads, to run on a single CPU, and/or multiple CPUs all sharing the same memory.

Memory 112 can be any of a number of commercially-available types of digital computer memory, such as RAM, Flash memory, disk memory, and/or other types of memory devices, that may be accessed by the CPUs 102, 104, 106, and 108. The CPUs 102, 104, 106, and 108 may also include connections to and from external devices (not shown) controlled by the CPUs 102, 104, 106 and 108. The devices coupled to the CPUs 102, 104, 106, and 108 may include I/O devices, communication devices, and/or any other devices that are controllable by the CPUs 102, 104, 106, and 108. In one embodiment, the CPUs are part of a Storage Area Network (SAN) adapter board used in connection with a SYMMETRIX™ Data Storage device provided by EMC Corporation of Hopkinton, Mass. However, it will be appreciated by one of ordinary skill in the art that the system described herein may be adapted for use in any application where a CPU is programmed with multitasking (multiprocess) software to perform CPU-related functions.

Figure 2:
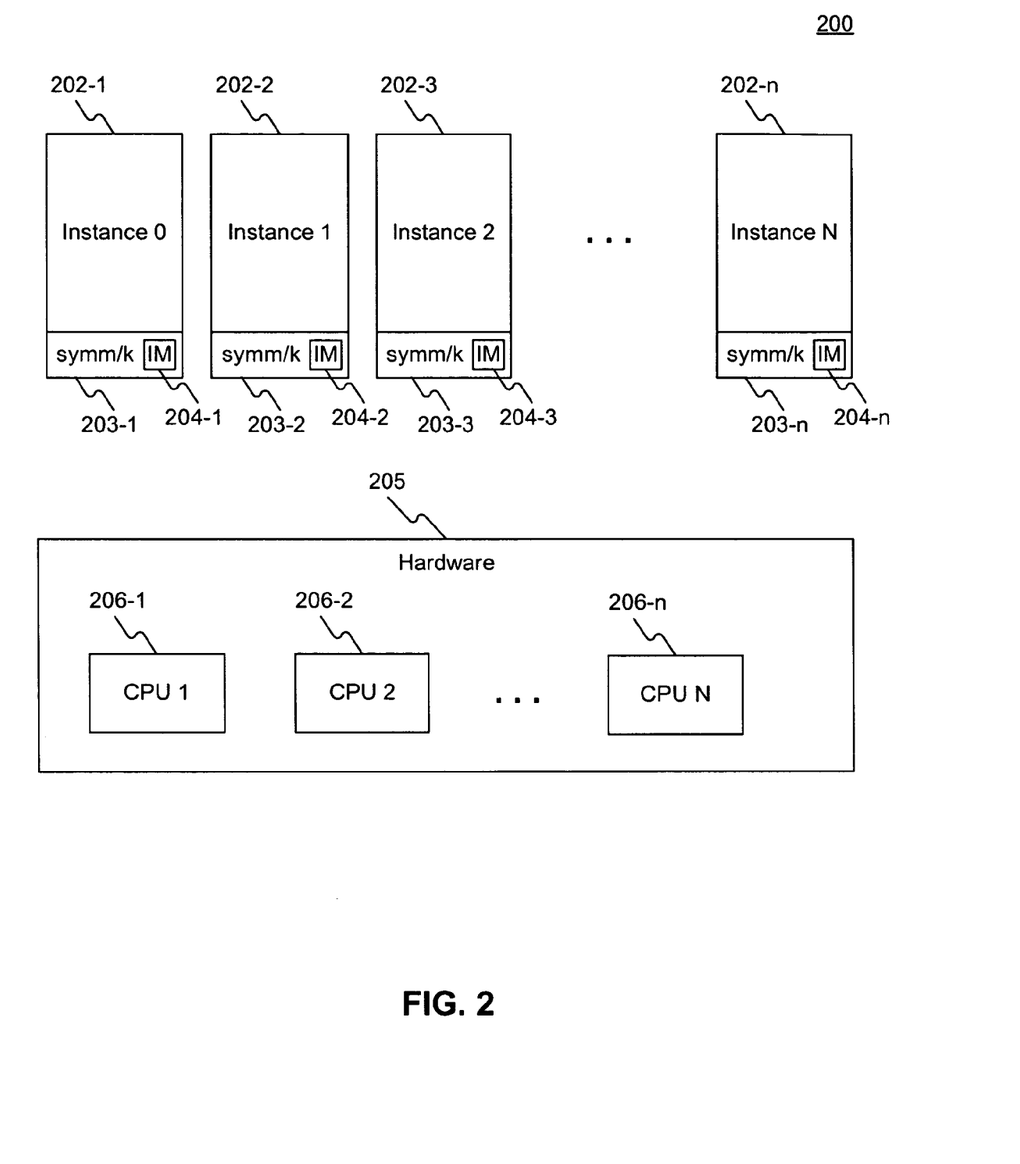
FIG. 2 illustrates another multiprocessor environment, consistent with features and principles of the present invention.

FIG. 2 illustrates another exemplary multiprocessor environment, consistent with features and principles of the present invention. System 200 includes one or more software instances 202-1, . . . , 202-n. As used herein, the term "instance" refers to a set of independent threads of execution each with its own code context, interrupt service routines, drivers and OS services. Each instance 202-1, . . . , 202-n includes an OS 203-1, . . . , 203-n, such as the Symm/K OS available from EMC Corp., as well as an instance manager 204-1, . . . , 204-n. Each instance 202-1, . . . , 202-n may be written to be executed on a single CPU or CPU complex.

Each instance 202-1, . . . , 202-n may include a thread scheduler for its own threads. The thread scheduler's functions can be executed preemptively or cooperatively, as described further below. A thread scheduler may run concurrently or simultaneously with the thread schedulers of other instances if there are multiple CPUs.

Hardware 205 may include a CPU complex including one or more CPUs 206-1, . . . , 206-n. In another embodiment, one single CPU can contain more than one instance running on the CPU.

Each instance manager 204-1, . . . , 204-n chooses an instance 202-1, . . . , 202-n to run on the CPU complex once another instance 202-1, . . . , 202-n that is running has been preempted, cooperatively yielded the CPU or has terminated. Instance managers 204-1, . . . , 204-n are described in greater detail below.

Any instance or set of instances may also register interrupt service routines (ISRs) for some hardware interrupt. ISRs must run in the processor state of the instance 202-1, . . . , 202-n that installed them. ISRs must also run on the CPU that received the interrupt. When an interrupt is received on a CPU for which there is no registered ISR in the currently running instance, a normal context save happens, instance manager code in Symm/K determines which instance(s) this interrupt goes to, performs an "instance swap" and runs the ISR within those instance(s), and restores the saved context back to the interrupted instance. If an interrupt is received on a CPU for which there is a registered ISR in the currently running instance, then a normal context save happens, runs the ISR within the current instance, and restores the saved context back to the interrupted instance. This process is explained in greater detail below.

Figure 3A:
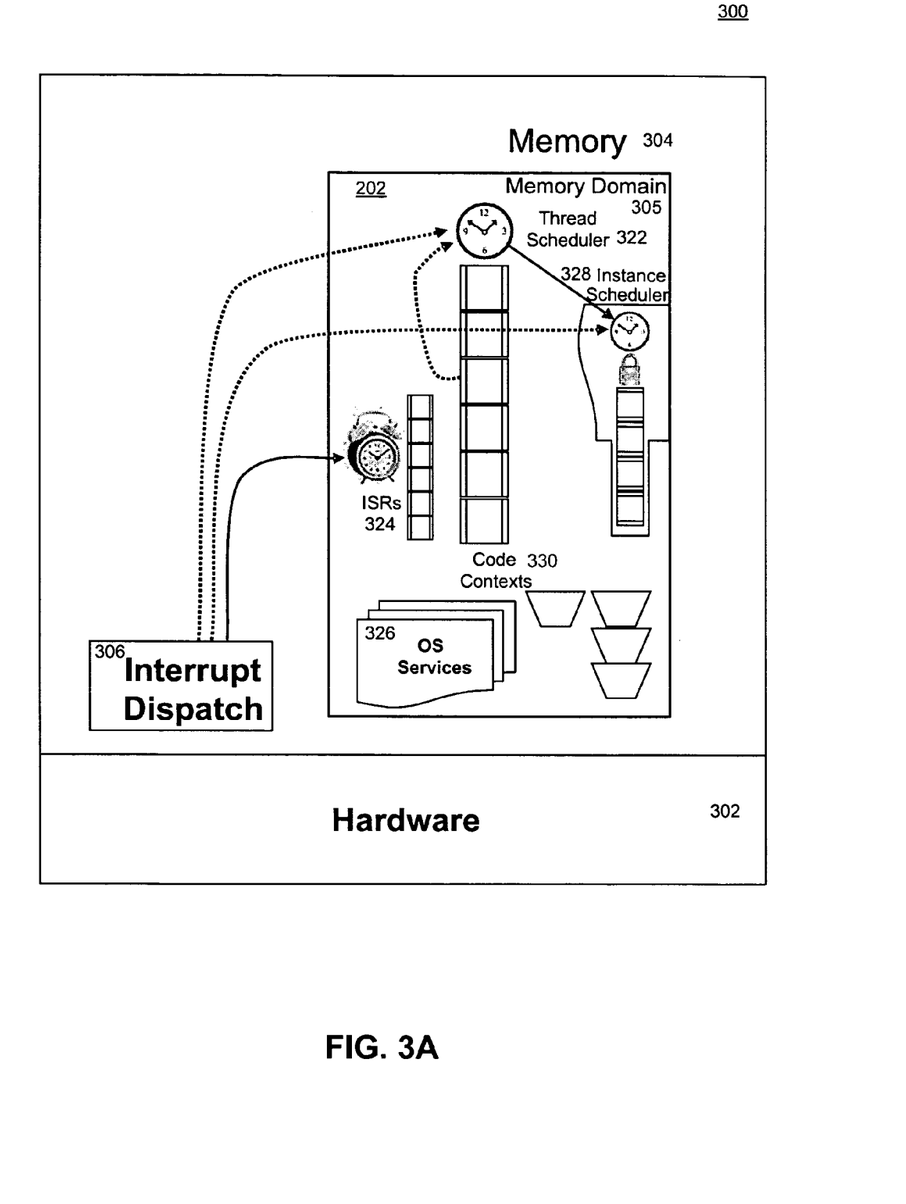
FIGS. 3A and 3B each illustrate a multiprocessor environment, consistent with features and principles of the present invention.
Figure 3B:
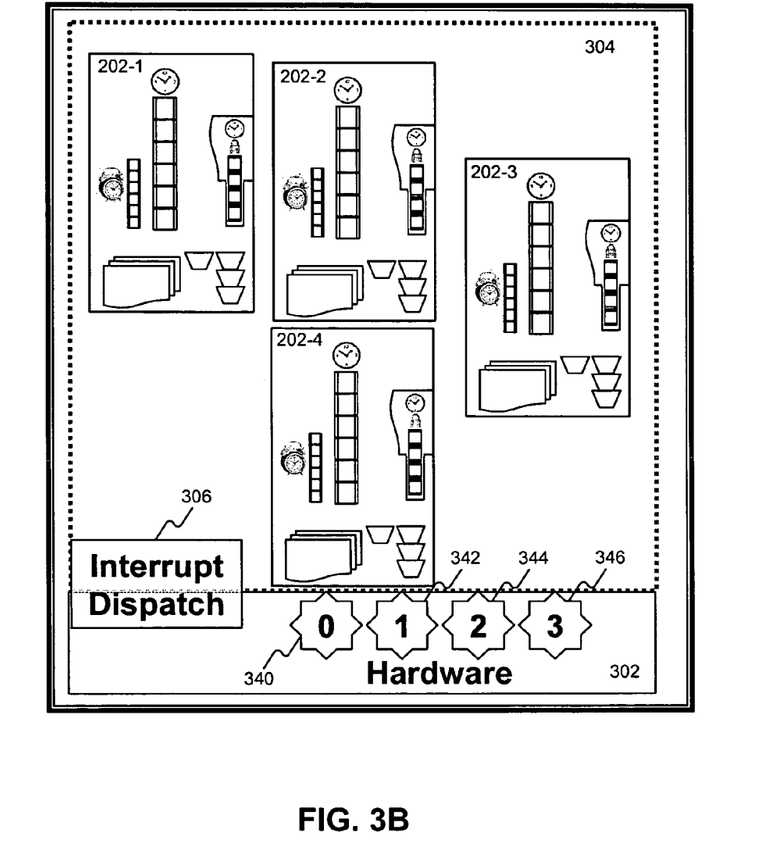

FIG. 3B illustrates another multiprocessor environment, where one or more instances may run on one or more CPUs, consistent with features and principles of the present invention. System 300 includes hardware 302 and memory 304. Hardware 302 includes a CPU complex and associated peripheral devices (not shown). Memory 304 can be partitioned in a variety of ways. Any particular contiguous set of addresses is referred to as a memory domain 305. One memory domain 305 may overlap and share some sets of addresses with another memory domain. A memory domain 305 may also completely enclose another memory domain 305 and may include memory-mapped hardware registers.

System 300 further includes interrupt dispatch code 306, which runs when hardware interrupts, exceptions, and other system events occur. Each instance 202 may contain thread scheduler 322, ISRs 324, OS services 326, and instance scheduler 328. Thread scheduler 322 in FIG. 3A manages a table of code contexts 330 and determines which one(s) will be active. Thread scheduler 322 may be invoked by a timer interrupt (preemption) and/or an active code context 330 (cooperative).

ISRs 324 in FIG. 3A are special code contexts that preempt thread contexts. ISRs 324 are invoked by the interrupt dispatch code 306. ISRs 324 must run on the CPU(s) that receive the interrupt. ISR policies insure that it is always possible to run an ISR 324 in the processor state of the instance 202 that registered it, on a CPU on which that the instance 202 is allowed to run.

OS services 326 are nondriver code routines that are common to the OS. The OS services 326 may control platform hardware as well as provide logical functions.

During configuration, an instance 202 is allowed to run on a single CPU, a subset of CPUs, or all CPUs. These permissions can be recorded in the instance table. If an instance 202 is allowed to run on any CPU, it is considered to be unbound.

If an instance 202 that is bound to a single CPU installs an ISR 324, that interrupt is mapped (configured by software to be received) only to that single CPU. If an instance 202 that is bound to a subset of CPUs installs an ISR 324, that interrupt is mapped to that subset of CPUs. If an instance 202 that is unbound installs an ISR 324, that interrupt is mapped to all CPUs. Single instance 202 may register more than one ISR 324 for any interrupt. These chained ISRs 324 will run in the order in which they were registered. If more than one instance 202 installs an ISR 324 for the same interrupt (instance chaining), that interrupt is mapped to the union of all CPUs involved with that set of instances 202. ISRs 324 registered by more than one instance 202 are not guaranteed to run in any given order, although each ISR 324 chain within a specific instance 202 will run in the order registered.

An instance 202 may use all of platform memory 304, but it most often uses a smaller memory domain 305. Each instance 202 contains an instance scheduler 328 that is shared amongst all the instances 202. The instance scheduler 328 runs when the thread scheduler 322 goes into its idle loop. The instance scheduler 328 may also have additional triggers, such as a timer interrupt.

An instance 202 may load other instances into different memory domains 305. If there are more than one CPUs, then more than one instance 202 can run simultaneously—one instance 202 per CPU. Multiple instances 202 on different CPUs may not need to be swapped synchronously.

As shown in FIG. 3B, multiple instances can be configured to run on any single CPU. In FIG. 3B, system 304 includes platform memory 304 and hardware 302. Memory 304 includes four instances 202-1, . . . 202-4, and the hardware 302 contains four CPUs 340, 342, 344, and 346. Instance 202-1 may be dedicated to CPU 340 and CPU 342, instances 202-2 and 202-3 may be dedicated to CPU 344, and instance 202-4 may be dedicated to CPU 346. Each instance may execute on the single CPU dedicated to running that instance for a period of time. Alternatively, a single instance can be configured to run on more than one of the multiple CPUs in the system. Such an instance always runs on only one of the eligible CPUs during any specific period of time.

Figure 4:
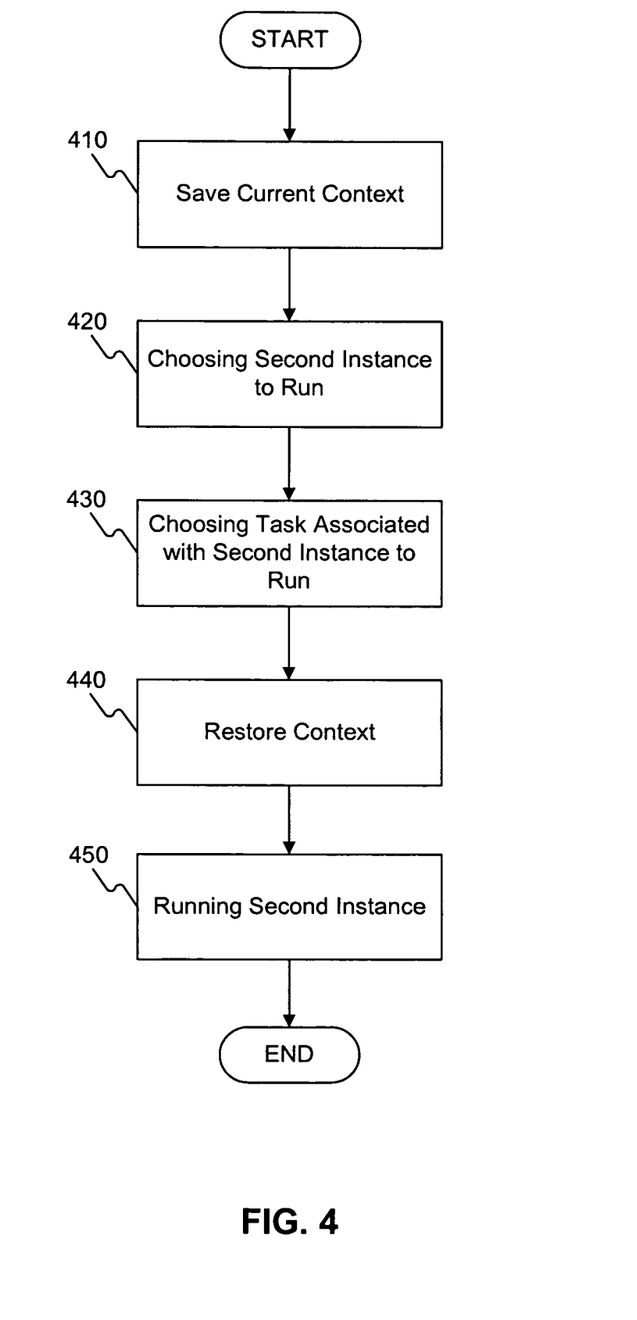
FIG. 4 illustrates a flow chart of a method for running a plurality of software instances, consistent with features and principles of the present invention.

FIG. 4 illustrates a flow chart of an exemplary method for running a plurality of software instances, consistent with features and principles of the present invention. In operation, any one of instances 202-1, . . . , 202-n can be running on CPU complex 340-346. A hardware interrupt may then occur, which causes the CPU to save its state of execution via a context switch, and begin execution of an interrupt handler. Software interrupts are usually implemented as instructions in the instruction set, which cause a context switch to the interrupt handler similarly to a hardware interrupt.

Current context is saved in stage 410. This may occur, for example, in response to an interrupt. In a context switch, the processor state of the currently running thread must be saved, so that when the thread scheduler 322 (cf. FIG. 3A) gets back to the execution of the interrupted thread, it can restore this state and continue normally. The processor state of a thread includes all the registers that the thread may be using, especially the program counter and the page table address register, plus any other OS specific data that may be necessary. Often, all the data that is necessary for saving the state is stored in one data structure called a context block.

Once the current context is saved, the instance manager 204 of the instance 202 that received the interrupt must determine which instance to run next (stage 420). The instance manager 204 may use any of the selection methods familiar to those skilled in the art, such as a round robin method, to determine the second instance to run.

The instance scheduler can be triggered both cooperatively and preemptively. Voluntarily yielding time to each instance is known as cooperative scheduling. An instance 202 may cooperatively release the CPU to another instance. Preemptive scheduling allows the computer system to more reliably guarantee each instance a regular "slice" of operating time. It also allows the system to rapidly deal with important external events like incoming data, which might require the immediate attention of one or another instance. Preemptive scheduling involves the use of an instance scheduler 328 (cf. FIG. 3A), which hands out CPU time to various instances so that they can share the CPU resources fairly. Therefore, all instances will get some amount of CPU time during a given time interval.

Instance scheduler 328 (cf. FIG. 3A) must determine which instance to run next (stage 420). Page tables may be used to swap from one instance to another. A page table is the data structure used by a virtual memory system in a computer OS to store the mapping between virtual addresses and physical addresses. The page table holds the mapping between a virtual address of a page and the address of a physical frame.

Thread scheduler 322 (cf. FIG. 3A) may then execute to determine which thread internally to run (stage 430). The thread scheduler 322 may be invoked either by a periodic timer interrupt that causes the thread scheduler 322 to run or by a software trap executed by a running program that causes the thread scheduler 322 to run. In either case, the thread scheduler 322 may examine the state of the currently running instance and, if the thread may be swapped out, swaps the thread out and runs another thread. There are a variety of known techniques for thread swapping in a multitasking OS. In an embodiment of the present invention, a round robin swapping technique is used. Finally, a context restore occurs restoring context to the second instance (stage 440). Instance manager 204 may then restore context of the second instance. The second instance may then be run on the system (stage 450).

Figure 5:
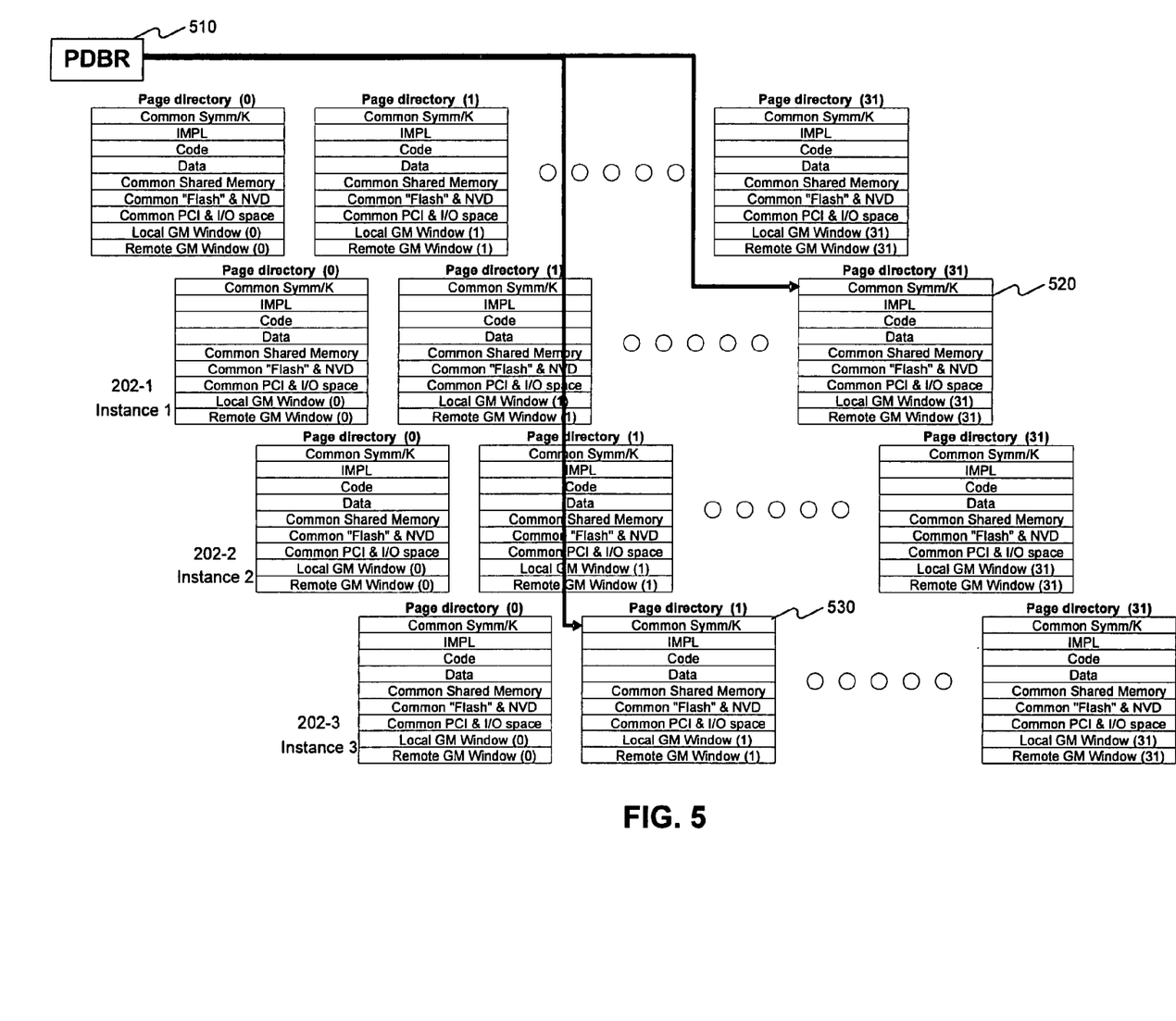
FIG. 5 illustrates an example of an instance swap, consistent with features and principles of the present invention.

FIG. 5 illustrates an example of an instance swap, consistent with features and principles of the present invention. FIG. 5 illustrates an instance swap from instance 1, 202-1 to instance 3, 202-3. As shown in FIG. 5, the page table address register (PDBR) 510 points to the page tables for whatever instance is to run. In this example, instance 1, 202-1 using page table 520 was swapped out for instance 3, 202-3 using page table 530.

It may be appreciated by one of ordinary skill in the art that other instance swapping techniques, such as techniques that provide different priority levels to some of the instances, and/or techniques that determine which instances have been swapped in least recently, may also be used.

The embodiments and aspects of the invention set forth above are only exemplary and explanatory. They are not restrictive of the invention as claimed. Other embodiments consistent with features and principles are included in the scope of the present invention. As the following sample claims reflect, inventive aspects may lie in fewer than all features of a single foregoing disclosed embodiment. Thus, the following claims are hereby incorporated into this description, with each claim standing on its own as a separate embodiment of the invention.

What is claimed is:

1. A method for running a plurality of software instances on an embedded computer system without requiring substantial modifications to each software instance, comprising:
running a first instance of the plurality of instances on a first CPU of a plurality of CPUs of the computer system;

running a second instance of the plurality of instances on a second CPU of the plurality of CPUs of the computer system, wherein the first instance and the second instance are run according to an instance scheduler;

storing context information relating to the first instance, wherein each of the first instance and the second instance comprises a set of independent threads of execution, an operating system, and a thread scheduler that performs scheduling or swapping of threads among the set of independent threads internal to each instance;

providing page tables that map virtual addresses and physical addresses and are used to swap instances;

choosing the second instance from among the plurality of instances, wherein the choosing is performed by the instance scheduler; and swapping the second instance for the first instance, wherein the swapping is performed using the instance scheduler and the page tables, wherein the second instance is configured to run on the first CPU and the second CPU, wherein the second instance is running on the second CPU and is then swapped to run on the first CPU.

2. The method of claim 1, wherein choosing second instance from among the plurality of instances is performed using a round robin schedule.

3. The method of claim 1, wherein choosing the second instance from among the plurality of instances can be invoked cooperatively or preemptively.

4. The method of claim 1, wherein the operating system services are nondriver code routines that are common to the operating system.

5. The method of claim 1, wherein each instance is configured to run on multiple CPUs.

6. A system for running a plurality of software instances on an embedded computer system without requiring substantial modifications to each software instance, the system comprising:

a plurality of central processing units (CPUs); and at least one memory, wherein the plurality of CPUs and the at least one memory are configured to perform a method comprising:

running a first instance of the plurality of instances on a first CPU of a plurality of CPUs of the computer system;

running a second instance of the plurality of instances on a second CPU of the plurality of CPUs of the computer system, wherein the first instance and the second instance are run according to an instance scheduler;

storing context information relating to the first instance, wherein each of the first instance and the second instance comprises a set of independent threads of execution, an operating system, and a thread scheduler that performs scheduling or swapping of threads among the set of independent threads internal to each instance;

providing page tables that map virtual addresses and physical addresses and are used to swap instances;

choosing the second instance from among the plurality of instances, wherein the choosing is performed by the instance scheduler; and swapping the second instance for the first instance, wherein the swapping is performed using the instance scheduler and the page tables, wherein the second instance is configured to run on the first CPU and the second CPU, wherein the second instance is running on the second CPU and is then swapped to run on the first CPU.

7. The system of claim 6, wherein choosing the second instance from among the plurality of instances is performed using a round robin schedule.

8. The system of claim 6, wherein choosing the second instance from among the plurality of instances can be invoked cooperatively or preemptively.

9. The system of claim 6, wherein the operating system services are nondriver code routines that are common to the operating system.

10. The system of claim 6, wherein each instance is configured to run on multiple CPUs.

11. A non-transitory computer readable memory that stores executable code for running a plurality of software instances on an embedded computer system, the executable code comprising:

executable code that runs a first instance of the plurality of instances on a first CPU of a plurality of CPUs of the computer system;

executable code that runs a second instance of the plurality of instances on a second CPU of the plurality of CPUs of the computer system, wherein the first instance and the second instance are run according to an instance scheduler;

executable code that stores context information relating to the first instance, wherein each of the first instance and the second instance comprises a set of independent threads of execution, an operating system, and a thread scheduler that performs scheduling or swapping of threads among the set of independent threads internal to each instance;

executable code that provides page tables that map virtual addresses and physical addresses and are used to swap instances;

executable code that chooses the second instance from among the plurality of instances, wherein the choosing is performed by the instance scheduler; and executable code that swaps the second instance for the first instance, wherein the swapping is performed using the instance scheduler and the page tables, wherein the second instance is configured to run on the first CPU and the second CPU, wherein the second instance is running on the second CPU and is then swapped to run on the first CPU.

12. The non-transitory computer readable memory of claim 11, wherein the executable code that chooses the second instance from among the plurality of instances includes executable code that uses a round robin schedule.

13. The non-transitory computer readable memory of claim 11, wherein the executable code that chooses the second instance from among the plurality of instances can be invoked cooperatively or preemptively.

14. The non-transitory computer readable memory of claim 11, wherein each instance is configured to run on multiple CPUs.

* * * * *